UNITED STATES PATENT OFFICE.

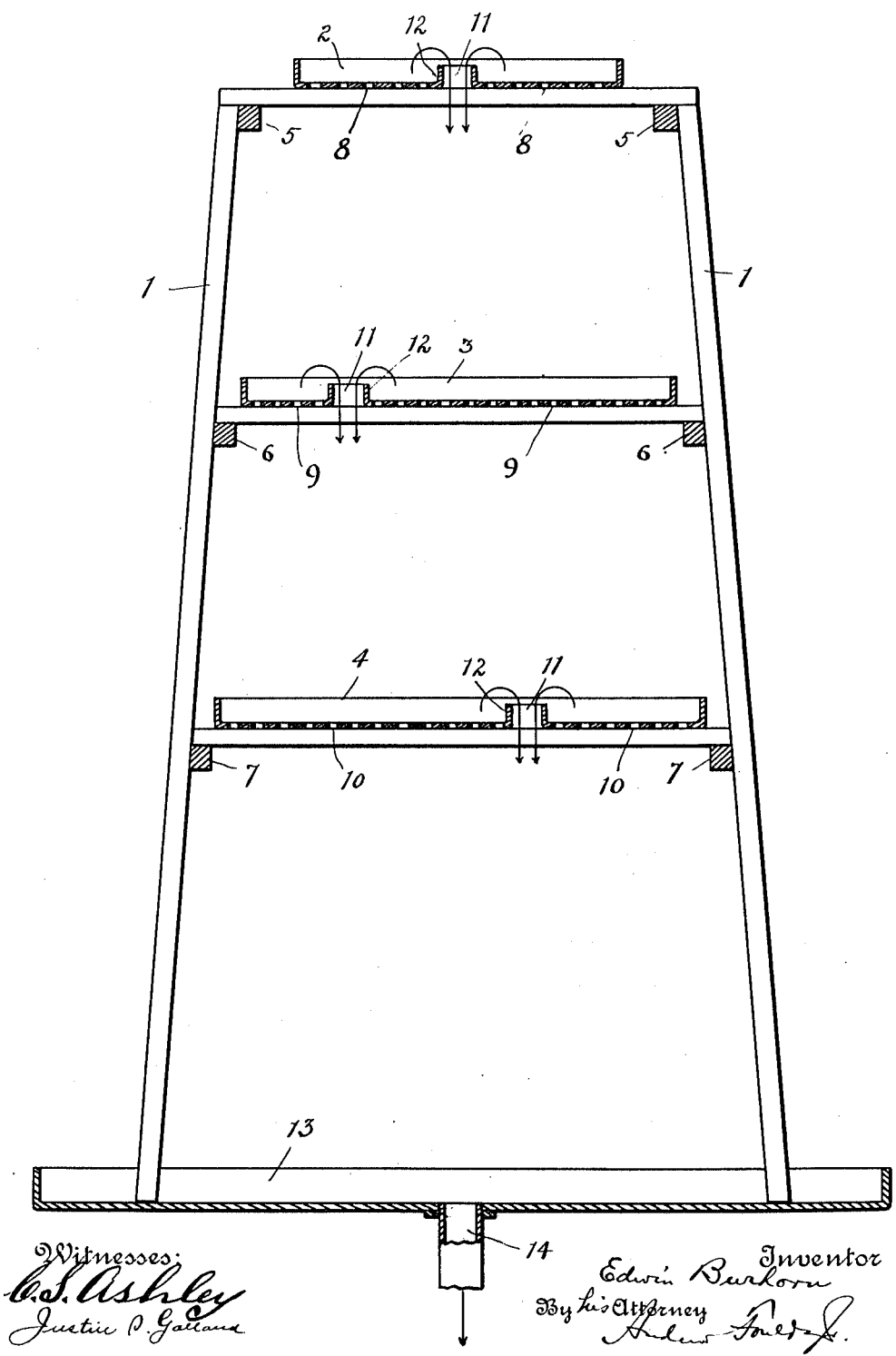

EDWIN BURHORN, OF HOBOKEN, NEW JERSEY.

COOLING-TOWER.

1,040,875.  Specification of Letters Patent.  Patented Oct. 8, 1912.

Application filed February 6, 1911. Serial No. 606,984.

*To all whom it may concern:*

Be it known that I, EDWIN BURHORN, a citizen of the United States, and a resident of the city of Hoboken, in the county of Hudson and State of New Jersey, have invented certain new and useful Improvements in Cooling-Towers, of which the following is a specification.

My invention relates to improvements in cooling towers and the object of my device is to provide an effective device for cooling water. I accomplish this object by the device illustrated in the accompanying drawing in which is shown a vertical section of the device.

Similar characters refer to similar parts throughout the several views.

My device comprises a tower or framework 1, 1 having a series of shallow pans 2, 3, 4 arranged one above the other as decks, and resting upon supports 5 6 7 upon the frame 1, said pans 2, 3, 4 being provided with apertures or perforations 8, 9, 10 respectively in their bottoms to permit the water to drop through the device from pan to pan. In each of said pans I provide an emergency overflow comprising an aperture 11 surrounded by an annular collar 12 which rises in the pan to a point below the plane of the edges of the pan and so arranged that each of said overflows will not lie in a vertical line with the one below. I am aware that cooling towers have heretofore been constructed of a series of decks each comprising a perforated pan and my present invention does not reside broadly in pans of that construction. In operation it has been found, however, that the small apertures of a pan will sometimes become clogged by reason of impurities in the water, in which event the water will flow over the outer edges of the pan and impair the efficiency of the tower.

In my improved device, upon the clogging or stopping of the small apertures, the water in the pan will rise to the top of the collar 12 surrounding the emergency overflow aperture 11 and fall therethrough as indicated by the arrows to the pan below where it will be divided, by means of the small apertures therein, into small streams or drops and will continue from pan to pan to the receiving pan 13 from which it may be conveyed by means of the outlet 14 to a reservoir or other desired place in any well known manner. In operation the water is delivered in any desired manner to the upper pan 2 where it is divided into fine streams or drops by the apertures 8 through which it falls to the pan 3 below and from thence to the pan 4 and thence to the receiving pan 13 and in the event that the apertures of any of said several pans become clogged to the extent that they do not permit the flow of water as rapidly as delivered to the pan the water will not flow over the outer edge of the pan and be lost as in devices of this nature at present in use but the surplus water will flow through the emergency overflow 11 to the pan below.

Having thus described my invention what I claim is:

In a cooling tower a series of pans having perforated bottoms and arranged one above the other and each provided in its bottom with an emergency overflow comprising an aperture and an annular collar surrounding the same and having a height less than that of the sides of the pan whereby upon the clogging of the perforations in the pan, the water will pass through the emergency overflow, the overflow aperture of each pan being set out of the vertical line of the overflow apertures of the adjacent pans, substantially as shown and described.

Signed at New York in the county of New York and State of New York this 26th day of January A. D. 1911.

EDWIN BURHORN.

Witnesses:
JUSTIN S. GALLAND,
ALEXANDER ACKERSON.